July 1, 1930.         B. LEMPEK         1,768,914
KITCHEN UTENSIL
Filed June 20, 1928
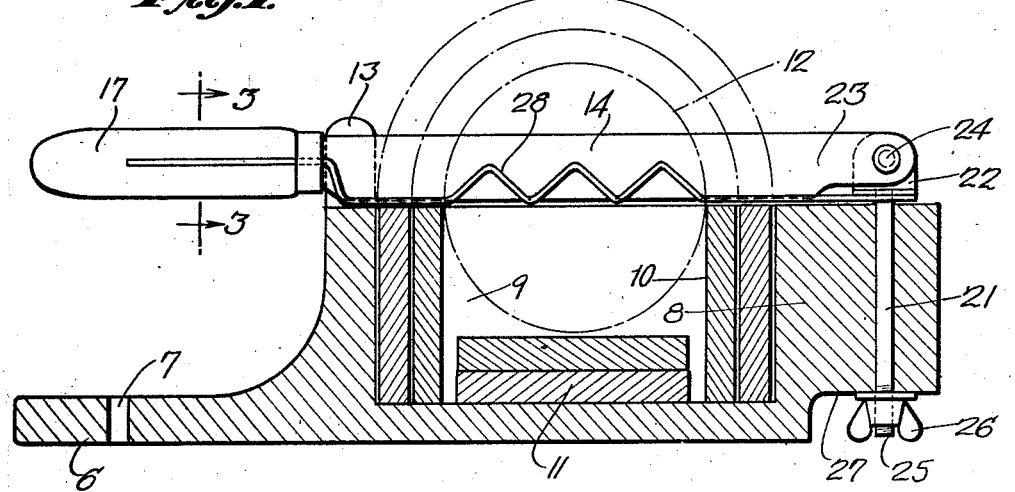
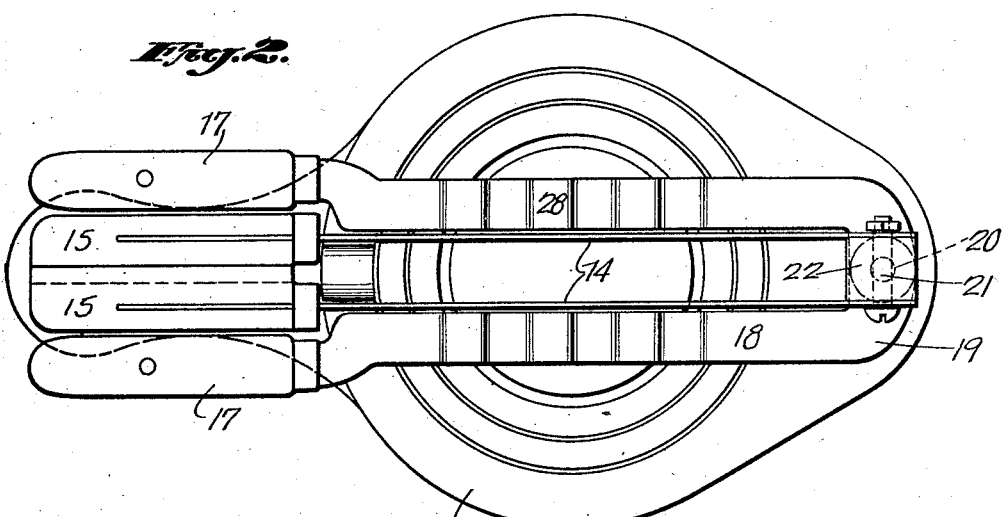
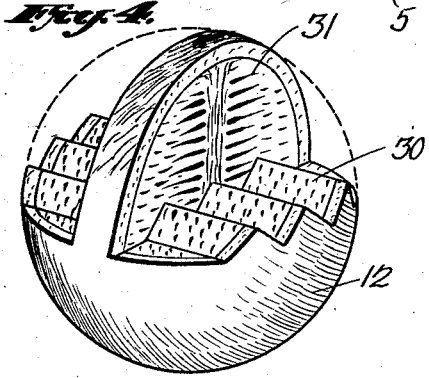
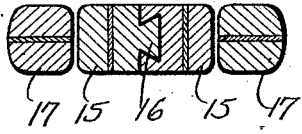
Inventor
BEN LEMPEK.
By His Attorney Patented July 1, 1930

1,768,914

UNITED STATES PATENT OFFICE

BEN LEMPEK, OF NEW YORK, N. Y.

KITCHEN UTENSIL

Application filed June 20, 1928. Serial No. 286,921.

This invention relates to kitchen utensils and in particular to an implement used in cutting fruit in fanciful shapes preparatory to serving the same.

A particular object of the invention is to provide a device in which can be placed, an apple, orange, grapefruit, or other spherical fruit so that the same can be cut in basket shape to enhance its appearance in serving.

In hotels and restaurants it is the practice to shape oranges, grapefruit and the like in basket formation by providing a ridged surface on the horizontal portion of the fruit and cutting vertically between said portions, a piece in simulation of a handle whereby a basket is formed and in which shape the fruit is served.

It has been a difficult matter to cut the fruit in such formation with knives and by hand due to the difficulty not only in holding the fruit but in properly cutting the same squarely and cleanly.

It is an object of my invention, therefore, to provide a device in which the fruit to be cut can be placed and a vertically operating knife can be swung down to cut out the handle of the basket after which two horizontally operating knives can be swung into position to cut out the basket forming segments of the fruit.

A still further object of the invention is to provide a device of this kind which will facilitate the cutting of the fruit and one in which the knives can be taken out of the device for sharpening and cleaning.

A still further object of the invention is to provide a device of the character referred to which is sanitary and in which means are provided for holding fruits of various sizes.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in sectional elevation illustrating the construction of my device and showing how the fruit of various sizes may be held therein.

Figure 2 is a top plan view of the utensil as illustrated in Figure 1.

Figure 3 is a section taken on the line 3—3 of Figure 1 and illustrates how the knife handles are brought together, the central two being so joined that they can be taken apart for sharpening, and Figure 4 is a view in perspective of an orange cut in basket shape, as the same would appear after having been operated upon in my cutting utensil.

Referring to the drawings in detail, 5 indicates the base and 6 a handle portion formed at one end thereof, the latter being provided with an opening 7 which is arranged to receive a screw or other holding member through the medium of which the device may be secured to a table. In the main portion 8 of the base, the same is provided with a receptacle 9 in which are arranged a plurality of concentric ring members 10, circular blocks 11 being provided within the inner member 10 to raise the fruit shown in outline and indicated by the numeral 12 high enough so that it will be properly cut by the knives.

It is quite evident that the concentric ring members 11 may be removed so that a larger fruit, such as a grapefruit, may be disposed in the receptacle 9 for cutting and the rings 11 are primarily for the purpose of maintaining a fruit of an particular size in proper position to be cut, the discs 11 being arranged to support the fruit in spaced relation with the bottom of the receptacle so that the cut in the fruit will not be taken at too high a point and thus destroy the effect.

The front edge of the base 8 is provided with a guide projection 13 over which passes the blades 14 of the vertically operated knife. One of the handles 15 of the knife blades 14 is provided with a tongue 16 and the other handle is grooved to receive the tongue so that the handles will maintain their proper relationship when assembled, to the utensil but which will permit their being taken apart for sharpening by sliding one handle relatively to the other to separate the knives. Alongside the handles 15 lie the handles 17 in which are secured the corrugated cutting blades 18 or horizontally operating knife members. These members at their outer ends are bent toward each other as at 19 to overlying position and are each provided with an opening 20 through which passes the stud portion 21 of a bolt, the upper end of which is enlarged as at 22 to hold the outer extremity 23 of the vertically operating knife blade 14, the same being pivoted to the member 22 through the medium of the bolt 24. The lower end of the stud is threaded as at 25 and is arranged to receive the wing nut 26 disposed in the recess 27 provided for that purpose in the under side of the base 5. It is quite evident that when a piece of fruit is placed within the receptacle 9 resting upon the block or disc 11 as illustrated in Figure 1, that a downward throw of the knife blades 14 will result in two cuts being made into the body of the fruit at spaced points, the knife being guided into its proper position through the medium of the guide projections 13. After this cutting operation has been completed, the side knives or corrugated knives 18 which, in their center portion may be provided with any number of corrugations 28, are drawn toward the handle 15 or are swung to closed position, they will pass through the sides of the fruit and will cut the corrugations 30 therein as illustrated in Figure 4. The handle 31 of the basket shaped fruit being provided, as before described, by the action of the vertical knives 14. The cutting edges of the corrugated blades 18 are arranged to strike against the outer of the surfaces of the cutting blades 14 so that the segment of fruit can be cut away clean, as illustrated in Figure 4.

It is quite evident, therefore, that I have provided a fruit cutting implement which will not only save time and labor but which will cleanly cut a handle and horizontally corrugated surface in a piece of fruit to simulate a basket thereby enhancing the appearance of the fruit and making the same more appetizing.

It is quite evident also that I have provided a fruit cutting implement which is arranged to accommodate fruits of various sizes and which can be operated quickly and without waste and also one which can be taken apart for the sharpening of the knives and the complete cleansing of the utensils.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. A kitchen utensil for use in preparing fruit for serving comprising a base having a receptacle therein, parallel knives pivoted at one end of the base and extending across said receptacle, a handle for each of said knives and a tongue and groove connection between the handles whereby the knives may be separated.

2. A kitchen utensil for use in preparing fruit for serving comprising a base having a receptacle therein, parallel knives pivoted for vertical movement at one end of the base and extending across said receptacle, horizontally operating corrugated knives pivoted at one end of the base and said corrugated knives being arranged for movement against the sides of said parallel knives.

3. A fruit shaping and cutting utensil comprising a base having a fruit receptacle therein, a plurality of concentric rings for use in the receptacle for holding different sizes of fruit, vertically movable knives pivoted at one end of the base and horizontally movable knives pivoted at one end of the base and arranged to cooperate with said vertically movable knives in cutting the fruit.

4. A fruit shaping and cutting utensil comprising a base, constituting a fruit receptacle, a plurality of knives connected to the base for horizontal, pivotal movement and a plurality of knives pivoted to the base for vertical movement, and all of the knives cooperating to cut the fruit in simulation of a basket.

In testimony whereof I affix my signature.

BEN LEMPEK. [L. S.]